(12) United States Patent
Zhu

(10) Patent No.: US 12,397,752 B2
(45) Date of Patent: Aug. 26, 2025

(54) TIRE CHOCK LOCK

(71) Applicant: Hangzhou Kairuifan Import and Export Trade Co., Ltd., Hangzhou (CN)

(72) Inventor: Shuifeng Zhu, Hangzhou (CN)

(73) Assignee: Hangzhou Kairuifan Import and Export Trade Co., Ltd., Hangzhou (CN)

( * ) Notice: Subject to any disclaimer, the term of this patent is extended or adjusted under 35 U.S.C. 154(b) by 390 days.

(21) Appl. No.: 18/305,336

(22) Filed: Apr. 22, 2023

(65) Prior Publication Data

US 2024/0351560 A1  Oct. 24, 2024

(51) Int. Cl.
*B60T 3/00* (2006.01)
(52) U.S. Cl.
CPC ..................................... *B60T 3/00* (2013.01)
(58) Field of Classification Search
CPC ........................................................ B60T 3/00
See application file for complete search history.

(56) References Cited

U.S. PATENT DOCUMENTS

| | | | |
|---|---|---|---|
| 5,392,880 A * | 2/1995 | Christian ................... | B60T 3/00 188/32 |
| 9,610,924 B1 * | 4/2017 | Searer ....................... | B60T 3/00 |
| 2010/0140026 A1 * | 6/2010 | Garceau .................... | B60T 3/00 188/69 |
| 2022/0306054 A1 * | 9/2022 | Bao ........................... | B60T 3/00 |

* cited by examiner

*Primary Examiner* — Timothy Hannon
(74) *Attorney, Agent, or Firm* — Hemisphere Law, PLLC; Zhigang Ma

(57) ABSTRACT

A rotatable tire chock lock is provided. The rotatable tire chock lock rotates its threaded rod to make its rotator face towards a user, thereby making it convenient for manual operation and using power tools. The rotator of the threaded rod is rotated to raise or lower an upper nut slider and a lower nut slider. Therefore, a quadrangular support structure that is connected between the two nut sliders can expand or retract to make support plates that are connected to the quadrangular support structure fit with tires located at the same side, thereby tightening the tires.

3 Claims, 9 Drawing Sheets

TIRE CHOCK LOCK

TECHNICAL FIELD

The disclosure relates to the field of wheel or tire wedges used in caravans and trailers. More particularly, the disclosure relates to a rotatable tire chock lock. The rotatable tire chock lock facilitates manual operation and using power tools by rotating its threaded rod to make a handle of the rotatable tire chock lock face towards a user.

BACKGROUND

Tire chock locks are used to prevent accidental rolling or movement of stationary vehicles or trailers, especially to prevent tires from moving, thereby effectively locking the tires. A problem with the current tire chock lock is that the current tire chock lock is placed in the same plane as the tires, and when rotating the rotator to achieve expansion and retraction functions, the operating space is limited, and it is not convenient to use the power tools. Therefore, there is a need for an improved tire chock lock that solves at least one problem existed in the related art.

SUMMARY

An object of the disclosure is to rotate the tire chock lock to make it perpendicular to a plane where tires are located, thereby creating greater operating space to make it more convenient for manual operation and using power tools.

In order to achieve the above objective, the disclosure provides a technical solution as follows. The disclosure provides a new-type tire chock lock, including a threaded rod, which includes a rotating portion and a threaded portion respectively disposed on two ends of the threaded rod, a first nut slider rotationally connected to the rotating portion of the threaded rod, a second nut slider screwed on the threaded portion of the threaded rod and a quadrangular support structure disposed between the first nut slider and the second nut slider. The disclosure further includes two support plates disposed on two ends of the quadrangular support structure respectively to support tires and steering assemblies, each of which is disposed between a corresponding one of the two support plates and the quadrangular support structure to rotate or lock the quadrangular support structure. The first nut slider is also equipped with a rotator, and an end of the rotator passes through an installation groove opened on the first nut slider and is fixedly connected with the rotating portion of the threaded rod.

In an embodiment, the quadrangular support structure includes a first pin shaft disposed on an end of the first nut slider, two groups of first support rods rotationally connected to the first nut slider through the first pin shaft, a second pin shaft disposed on an end of the second nut slider and two groups of second support rods rotationally connected to the second nut slider through the second pin shaft, and the two groups of first support rods and the two groups of second support rods together form the quadrangular structure. The quadrangular support structure further includes second transmission teeth disposed on ends of the second support rods in the two groups of second support rods, first transmission teeth disposed on ends of the first support rods in the two groups of first support rods. Each of the second transmission teeth is meshed with a corresponding one of the first transmission teeth. The quadrangular support structure further includes a plurality of drive support arms, including first drive support arms and second drive support arms. Each of the first drive support arms is disposed between the first support rods in each of the two groups of first support rods and each of the second drive support arms is disposed between the second support rods in each of the two groups of second support rods. Furthermore, each steering assembly is disposed on the ends of the second support rods in each of the two groups of second support rods and on the ends of the first support rods in a corresponding group of the two groups of first support rods (4) through a mounting structure.

In an embodiment, the steering assembly includes a connection frame, a limit bead fixing frame disposed on a side wall of the support plate. The limit bead fixing frame is mounted on the connection frame through a bolt structure. Furthermore, the steering assembly includes an elastic pad disposed on a side wall of the connection frame, which is used to facilitate rotating the limit bead fixing frame and the connection frame after mounting. Moreover, the steering assembly further includes a plurality of mounting holes disposed on the limit bead fixing frame, a plurality of limit bead housings disposed in the plurality of mounting holes respectively. An inlet end of each of the plurality of limit bead housings is provided with a movable limit bead and a spring connected between the limit bead and an inner wall of the limit bead housing for resetting the limit bead. The steering assembly further includes a plurality of limit holes disposed on the connection frame and the plurality of limit holes correspond to the plurality of mounting holes respectively to facilitate the limit beads entering the connection frame.

In an embodiment, two ends of connection frame are respectively provided with two groups of through holes, the mounting structure includes two connection rods, lock nuts and limit discs. The two groups of through holes are internally provided with the two connection rods, an end of each of the two connection rods is provided with an external thread and the end of each connection rod is screwed on a corresponding through hole of the two groups of through holes. Each of the first support rods and the second support rods is provided with a hole, and the two connection rods respectively penetrate through the holes of the first support rods and the second support rods to connect with the lock nuts for locking the first support rods and the second support rods with the connection frame. Furthermore, another ends of the two connection rods respectively penetrate the through holes to connect with the limit discs.

In an embodiment, a side wall of the first nut slider is provided with a handle and a soft pad disposed on a side wall of the handle.

In an embodiment, the support plate is provided with a plurality of antiskid textures and a plurality of antiskid strips disposed on the plurality of antiskid textures respectively and the plurality of antiskid strips are symmetrically arranged.

Compared with the related art, the disclosure has advantages as follows.

The disclosure takes advantages of the quadrangular support structure and structural characteristics of the steering assemblies cooperatively to adjust the rotation direction of the quadrangular support structure while adjusting the space between the tires, thereby to facilitate using the power tools to drive the threaded rod, reducing manual labor intensity, and improving work efficiency. Furthermore, the tire chock lock of the disclosure is compact and convenient to carry.

Figure 1:
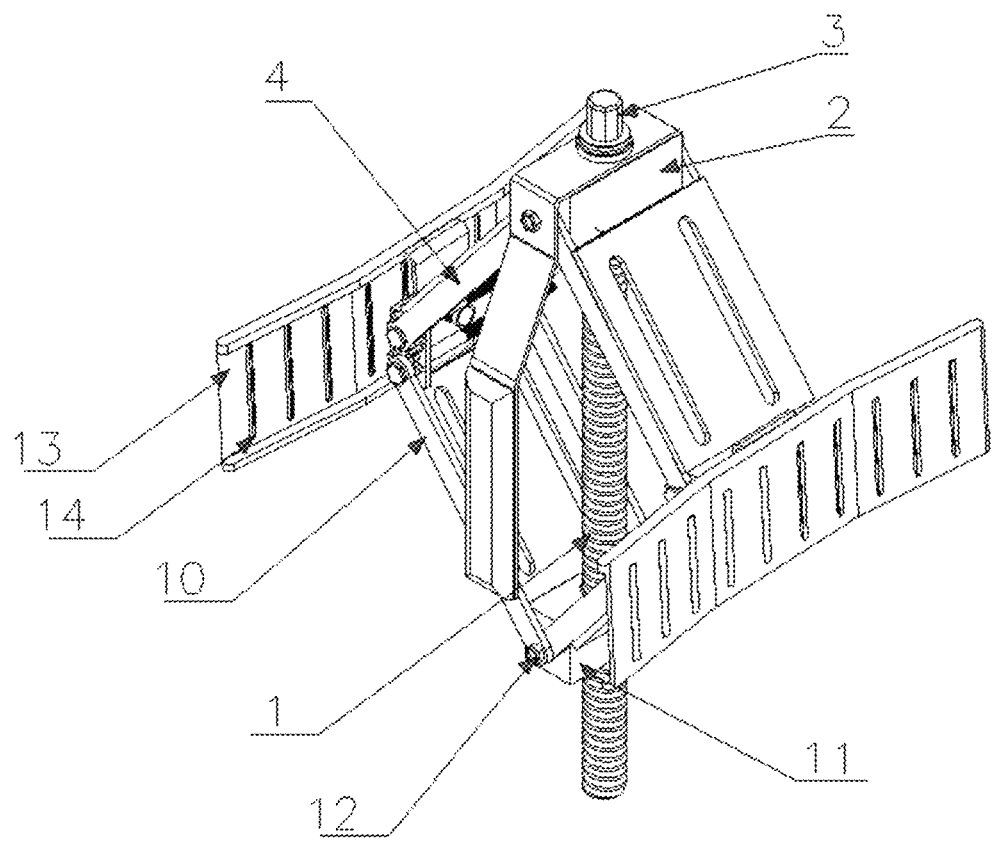
FIG. 1 illustrates a schematic structural diagram of a tire chock lock according to an embodiment of the disclosure.

Reference numerals: 1—threaded rod; 2, 11—nut slider; 3—rotor; 4—first support rod; 6—first transition tooth; 7—connection rod; 8—external thread; 9—second transition tooth; 10—second support rod; 12—second pin shaft; 13—support plate; 14—antiskid texture; 15—limit bead fixing frame; 16—connection frame; 17—first pin shaft; 18, 21—lock nut; 19—drive support arm; 20—step bolt; 22—limit bead; 23—limit bead housing; 24—handle; 25—soft pad; 26—limit disc; 27—antiskid strip; 28—connection hole; 29—limit hole; 30—through hole; 31—elastic pad.

DETAILED DESCRIPTION OF EMBODIMENTS

In the description of the disclosure, it is necessary to understand that the terms "length", "width", "up", "down", "front", "back", "left", "right", "vertical", "horizontal", "top", "bottom", "inside", "outside", etc. indicate an orientation or a positional relationship based on the orientation or the positional relationship shown in the attached drawings. These terms are only used to facilitate describing the disclosure and simplifying the description, rather than indicating or implying that the designated device or the designated component must have a specific orientation, be constructed and operated in a specific orientation. Therefore, the terms cannot be understood as a limitation to the disclosure. Embodiments of the disclosure are described in detail below in conjunction with attached drawings.

Referring to FIGS. 2 to 9, an illustrated technical solution of the disclosure is to provide a new type of tire chock lock. The new type of tire chock lock includes a threaded rod 1, including a rotating portion and a threaded portion respectively disposed on two ends of the threaded rod 1, a nut slider 2 rotationally connected to the rotating portion of the threaded rod 1, a nut slider 11 screwed on the threaded portion of the threaded rod 1, a quadrangular support structure disposed between the nut slider 2 and the nut slider 11, two support plates 13 disposed on two ends of the quadrangular support structure respectively to support tires, and steering assemblies, each of which is disposed between a corresponding one of the two support plates and the quadrangular support structure to rotate or lock the quadrangular support structure. The nut slider 2 is further provided with a rotator 3 thereon, and an end of the rotator 3 passes through an installation groove opened on the nut slider 2 and is fixedly connected with the rotating portion of the threaded rod 1, thereby to facilitate rotating the threaded rod 1.

Figure 4:
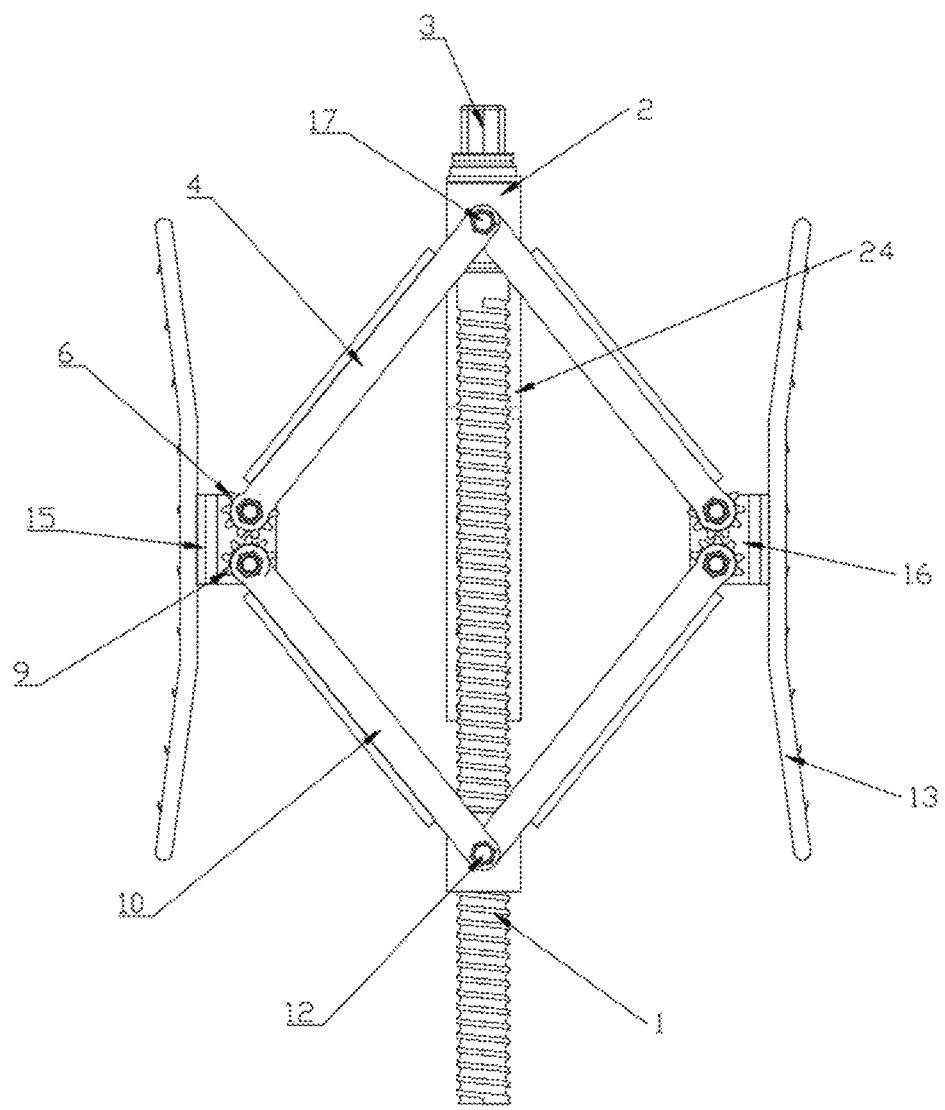
FIG. 4 illustrates a schematic structural diagram of the tire chock lock of FIG. 2 from a still another perspective.
Figure 5:
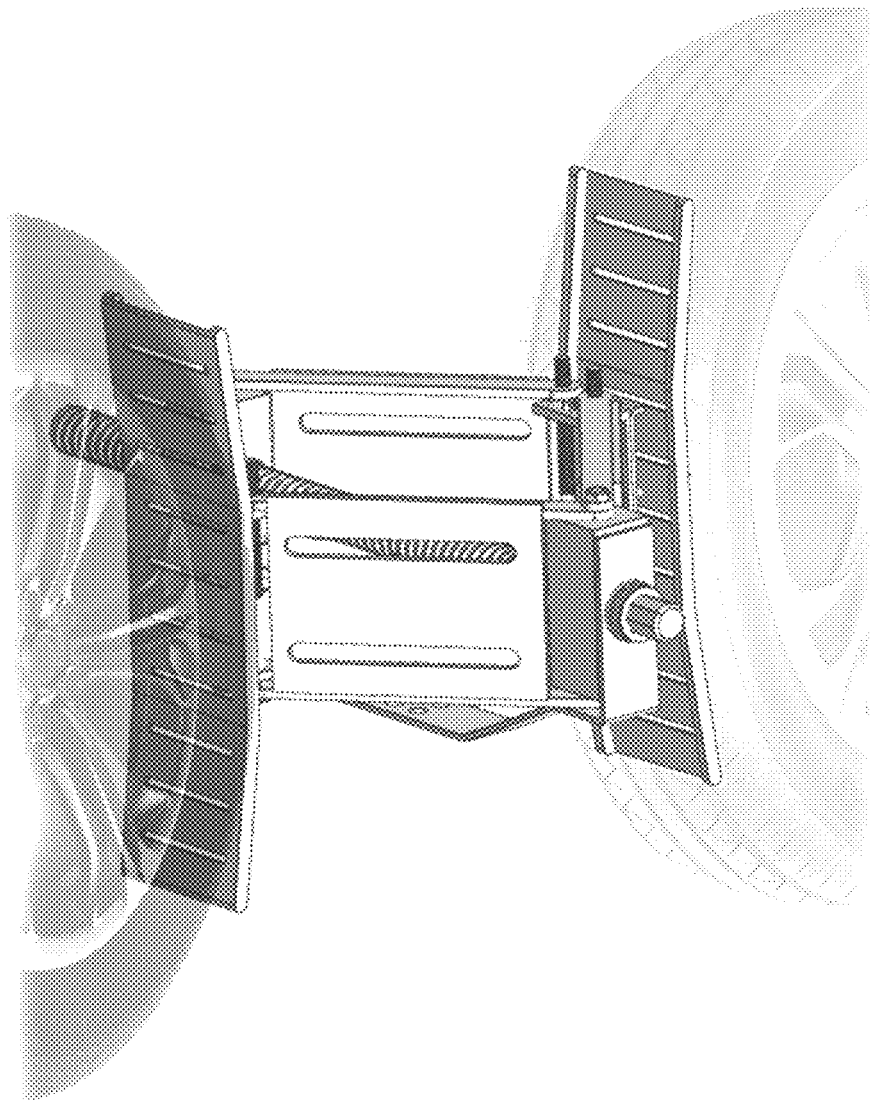
FIG. 5 illustrates a schematic diagram of the tire chock lock in use according to an embodiment of the disclosure.

As shown in FIG. 4, the nut slider 2 and the nut slider 11 are respectively disposed on the rotating portion and the threaded portion of the threaded rod 1 and the quadrangular support structure is disposed between the nut slider 2 and the nut slider 11 to cooperate with the two support plates 13 disposed on the two ends of the quadrangular support structure respectively and the structural characteristics of the quadrangular support structure. Therefore, when it is necessary to limit positions of the tires with reference to FIG. 2, the user rotates the threaded rod 1 to make the nut slider 11 move on the threaded rod 1, thereby achieving the quadrangular support structure to expand or retract in an orientation from left to right, and then realizing adjusting spacing between the two support plates 13 to adapt to the different distances between the tires with reference to FIG. 4. Specifically, in combination with FIG. 4, the tire chock lock can be placed between the two tires in the same side, and the spacing between the two support plates 13 can be adjusted to make the two support plates 13 collide with the two tires respectively, thereby limiting the positions of the two tires, and then the steering assemblies can rotate the quadrangular support structure to a suitable position to be locked. In an illustrated embodiment, the rotator 3 is a hexagonal structure, which is convenient for rotating the threaded rod 1 on the one hand and is also suitable for the existing power tools on the other hand. In addition, the power tool is specially an electric drill, realizing rotating the threaded rod 1 by an electric drive. When there is no need to limit the position of the vehicle, the threaded rod 1 can be reversely rotated to make the support plates 13 separate from the tires. By setting the quadrangular support structure in combination with the structural characteristics of the steering assemblies, it is possible to adjust steering orientation of the quadrangular support structure while adjusting the support spacing between the tires, thereby facilitating the power tool to drive the threaded rod 1, reducing manual labor intensity, and improving work efficiency. At the same time, the tire chock lock of the disclosure is compact and portable.

In an illustrated embodiment, the quadrangular support structure includes a first pin shaft 17 disposed on an end of the nut slider 2, two groups of first support rods 4 rotationally connected to the first nut slider 2 through the first pin shaft 17, a second pin shaft 12 disposed on an end of the nut slider 11 and two group of second support rods 10 rotationally connected to the second nut slider 11 through the second pin shaft 12. Namely, the two groups of first support rods 4 and the two groups of second support rods 10 together form a quadrangular structure. In an illustrated embodiment of the disclosure, each group of the two groups of second support rods 10 are two second support rods 10, similarly, each group of the two groups of first support rods 4 are two first support rods 4. Ends of the second support rods 10 are provided with second transmission teeth 9 and ends of the first support rods are provided with first transmission teeth 6. Each of the second transmission teeth 9 is meshed with a corresponding one of the first transmission teeth 6. The quadrangular support structure further includes a plurality of drive support arms 19, consisting of first drive support arms and second drive support arms. Each of the first drive support arms is disposed between the two first support rods 4 in each group of the two groups of first support rods 4 and each of the second drive support arms is disposed between the two second support rods 10 in each group of the two groups of second support rods 10. Each steering assembly is disposed on the ends of the second support rods 10 in each group of the two groups of second support rods 10 and on the ends of the first support rods 4 in a corresponding group of the two groups of first support rods 4 through a mounting structure.

Figure 2:
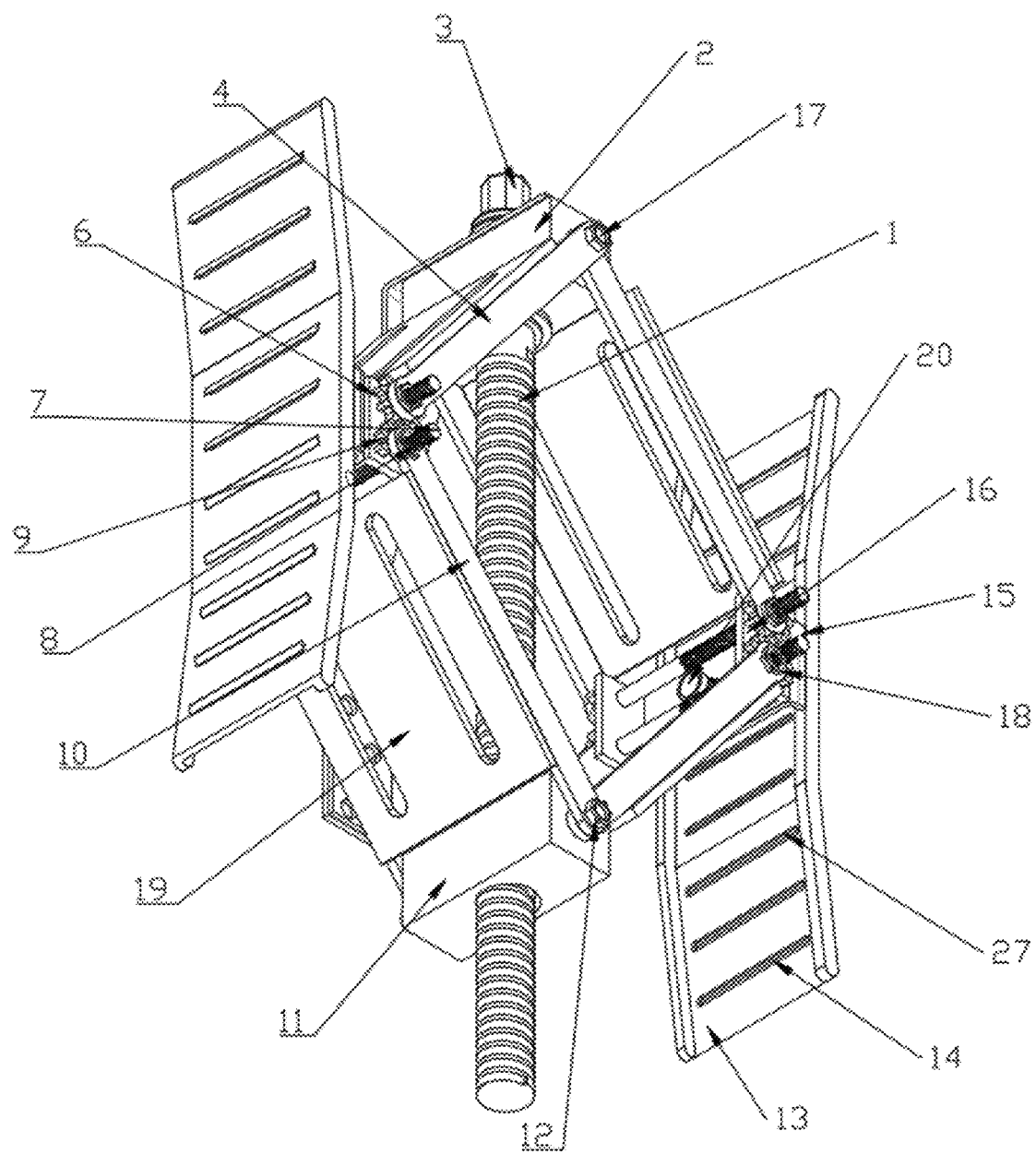
FIG. 2 illustrates a schematic structural diagram of a tire chock lock according to an embodiment of the disclosure from a perspective.

As shown in FIG. 4, the two groups of first support rods 4 are connected to the nut slider 2 and the two groups of second support rods 10 are connected to the nut slider 11, which facilitates forming the quadrangular structure. Furthermore, the first transmission teeth 6 disposed on the ends of the first support rods 4 are meshed with the second transmission teeth 9 disposed on the ends of the second support rods 10. Therefore, when the threaded rod 1 is rotated, namely when the nut slider 11 slides, the quadrangular support structure can expand or retract in an orientation of left to right. Specially, as shown in FIG. 2, when the threaded rod 1 is rotated to make the nut slider 11 close to the nut slider 2, the quadrangular support structure can expand in the orientation of left to right, thereby expanding the spacing between the two support plates 13 to make the two support plates 13 respectively close to the tires. Furthermore, with reference to FIG. 1 and FIG. 5, the two support plates 13 are brought in contact with the corresponding tires to complete tire limiting. Similarly, when the quadrangular support structure retracts in the orientation of left to right, namely that the spacing between the two support plates 13 becomes smaller, the tire limiting can be released, thereby achieving adjustment of the support spacing between the tires.

In an illustrated embodiment, each of the steering assemblies includes a connection frame 16 and a limit bead fixing frame 15 fixed to a side wall of the corresponding support plate 13, and the connection frame 16 and the limit bead fixing frame 15 are mounted through a bolt structure. In addition, an elastic pad 31 is disposed on a side wall of the connection frame 16 to facilitate rotating the limit bead fixing frame 15 and the connection frame 16 after mounting. The steering assembly further includes a plurality of mounting holes provided on the limit bead fixing frame 15, and a plurality of limit bead housings 23 disposed inside the plurality of mounting holes respectively. An inlet end of each of the plurality of limit bead housings 23 is provided with a movable limit bead 22 and a spring connected between the limit bead 22 and an inner wall of the limit bead housing 23 for resetting the limit bead 22. The steer assembly further includes a plurality of limit holes 29 disposed on the connection frame 16 and the plurality of limit holes 29 correspond to the plurality of mounting holes respectively to facilitate the limit beads 22 entering the connection frame 16.

Figure 9:
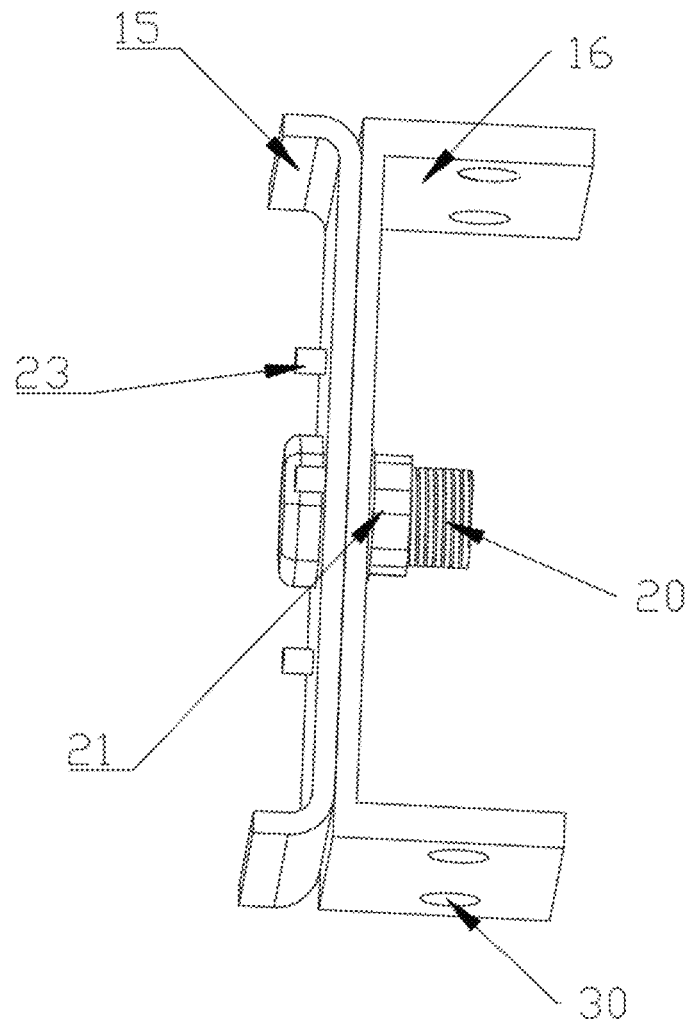
FIG. 9 illustrates a schematic structural diagram of the steering assembly of FIG. 8 from another perspective.

In the illustrated embodiment, the bolt structure is generally known in the related art, which includes connection holes 28 respectively opened on the connection frame 16 and the limit bead fixing frame 15, the elastic pad 31 disposed on an outer wall of the connection hole 28 opened on the connection frame 16 and a step bolt 20 capable of penetrate the connection holes 28 respectively opened on the connection frame 16 and the limit bead fixing frame 15. Furthermore, a head portion of the step bolt 20 is placed on a side of the limit bead fixing frame 15 and a rod portion of the step bolt 20 capable of penetrating the connection holes 28 is screwed on a lock nut 21. Therefore, when the lock nut 21 is rotated, the limit bead fixing frame 15 can be installed on or disassembled from the connection frame 16. As shown in FIG. 9, the limit bead fixing frame 15 is installed on the connection frame 16.

Figure 6:
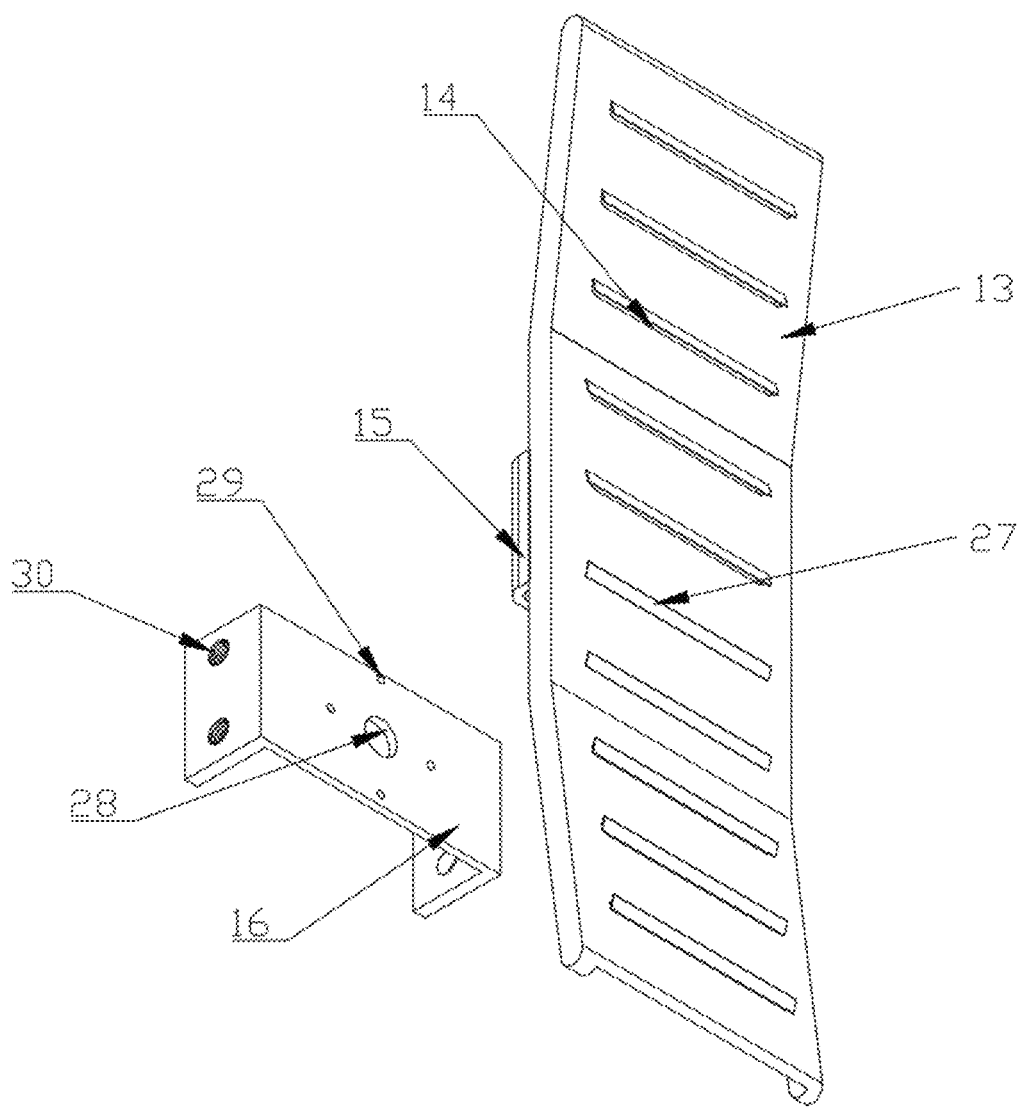
FIG. 6 illustrates a schematic enlarged structural diagram of a support plate according to the disclosure.
Figure 7:
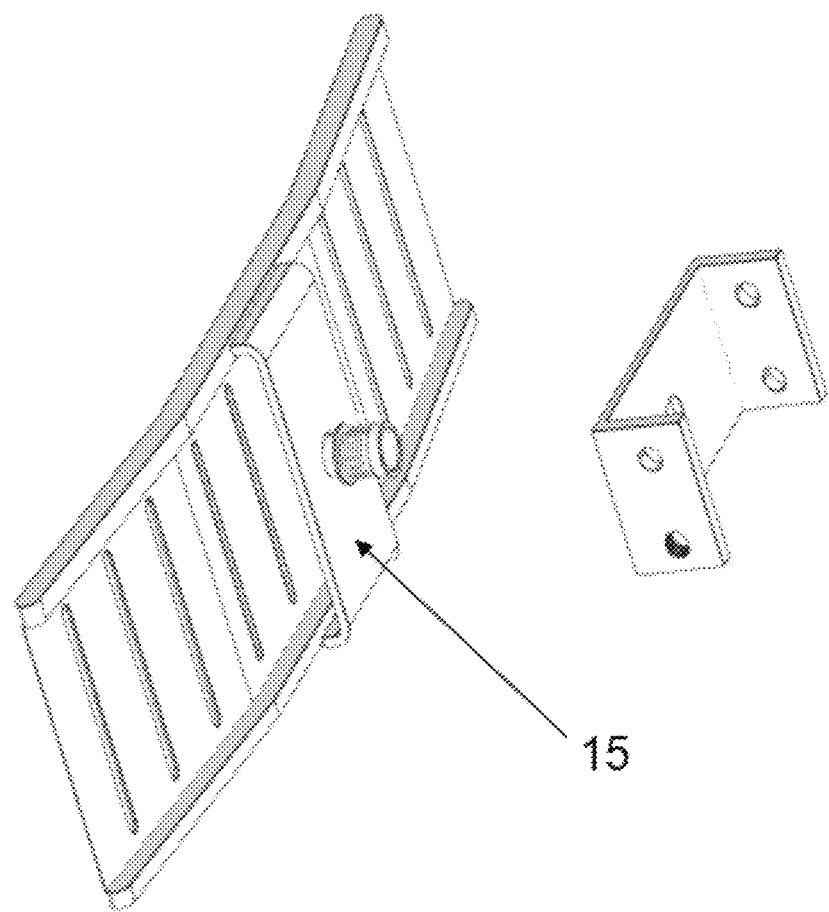
FIG. 7 illustrates another schematic enlarged structural diagram of the support plate according to the disclosure.
Figure 8:
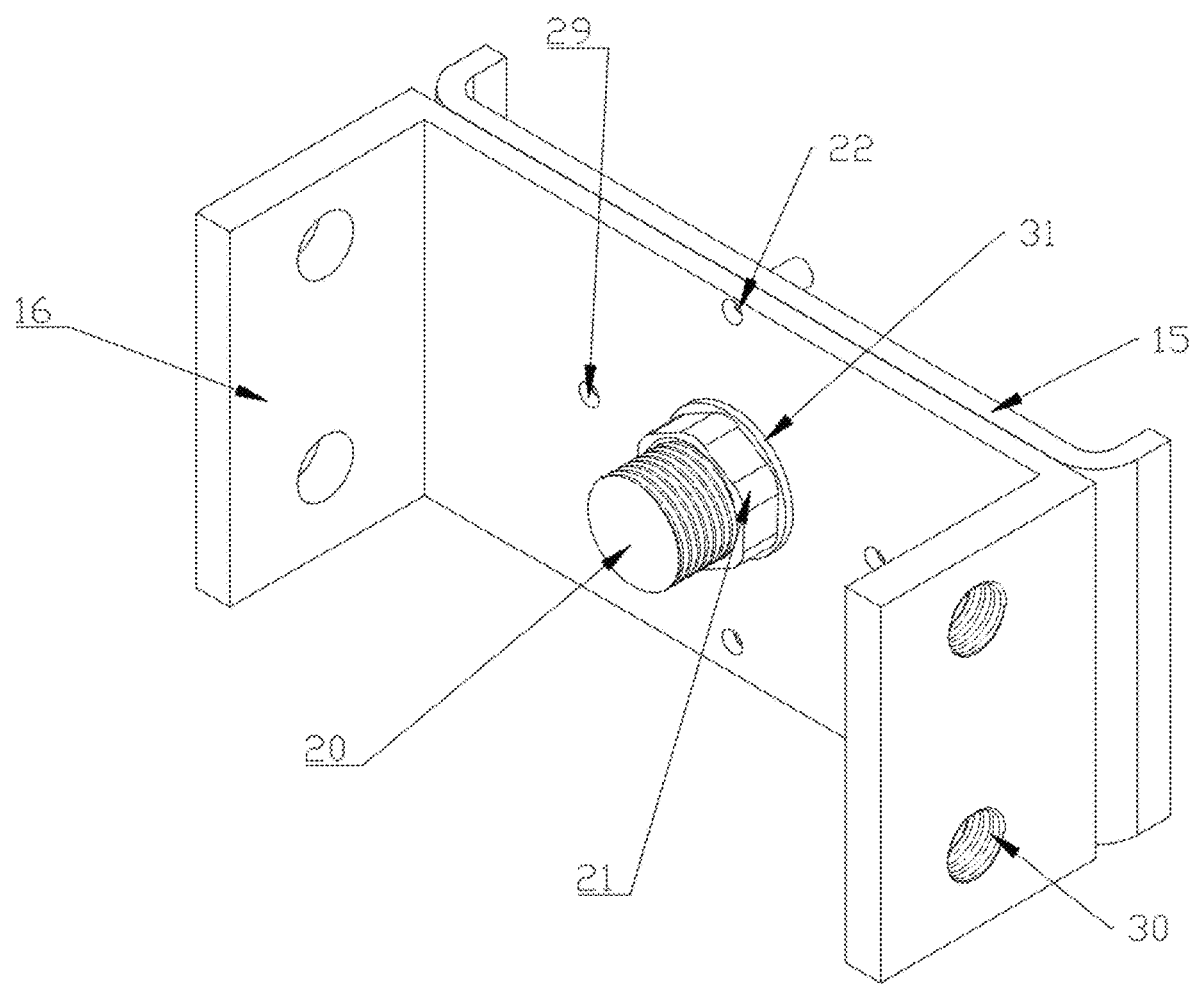
FIG. 8 illustrates a schematic enlarged structural diagram of a steering assembly according to the disclosure.

As shown in FIGS. 4, 6 and 8, in an illustrated embodiment, the number of the plurality of limit holes 29 is four. The limit bead housings 23 are disposed on the limit bead fixing frame 15 and the inlet ends of the limit bead housings 23 are provided with movable limit beads 22. Therefore, when the limit bead fixing frame 15 is docked with the connection frame 16, the limit beads 22 can enter the four limit holes 29 disposed on the connection frame 16 correspondingly. And then, the limit bead fixing frame 15 is installed on the connection frame 16 through the bolt structure. When it is necessary to adjust steering orientation of the quadrangular support structure, it is possible to fully take advantages of the characteristics of the quadrangular support structure, such as the limit bead fixing frame 15 disposed on the side wall of the support plate 13, the limit beads 22 with special shape and the function of the elastic pad 31. Namely, when the limit bead fixing frame 15 is separated from the connection frame 16, the elastic pad 31 is first pressed, and then the connection frame 16 is rotated. In other words, when the quadrangular support structure is rotated, the limit beads 22 are retracted. Since the limit holes 29 are specially four, when the connection frame 16 rotates by 90 degrees, the limit holes 29 and the limit beads 22 can be docked again, and the step bolt 20 can re-enter the connection holes 28 under the action of the springs, thereby realizing self-locking of the quadrangular support structure.

In an illustrated embodiment, two ends of the connection frame 16 are respectively provided with two groups of through holes 30 and each mounting structure includes two connection rods 7, lock nuts 18 and limit discs 26. In the embodiment, the two groups of through holes 30 are internally provided with the two connection rods 7, an end of each of the two connection rods 7 is provided with an external thread 8 and the end with the external thread 8 of the connection rod 7 is screwed on a corresponding through hole 30 of the connection frame 16. Furthermore, each of the first support rods 4 and the second support rods 10 is provided with a hole and the two connection rods respectively penetrate the holes of the first support rods 4 and the second support rods 10 to connect with the lock nuts 18 for locking the first support rods 4 and the second support rods 10 with the connection frame 16. Moreover, another ends of the two connection rods 7 respectively penetrate the through holes 30 of the connection frame 16 to connect with the limit discs 26.

As shown in FIG. 2, when it is necessary to install the steering assemblies on the ends of the two groups of first support rods 4 and the ends of the two groups of second support rods 10, the lock nuts 18 are screwed to make the connection frames 16 of the steering assemblies install on the two groups of first support rods 4 and the two groups of second support rods 10, which is simple and convenient to operate. Similarly, when it is necessary to disassemble the steering assemblies from the ends of the two groups of first support rods 4 and the ends of the two groups of second support rods 10, the lock nuts 18 are loosened to make the connection frames 16 of the steering assemblies separate from the two groups of first support rods 4 and the two groups of second support rods 10. In the embodiment, the number of the steering assemblies is two, which are respectively disposed between the two support plates 13 and the quadrangular structure.

In an illustrated embodiment, a side wall of the nut slider 2 is provided with a handle 24 and a soft pad 25 disposed on a side wall of the handle 24.

Figure 3:
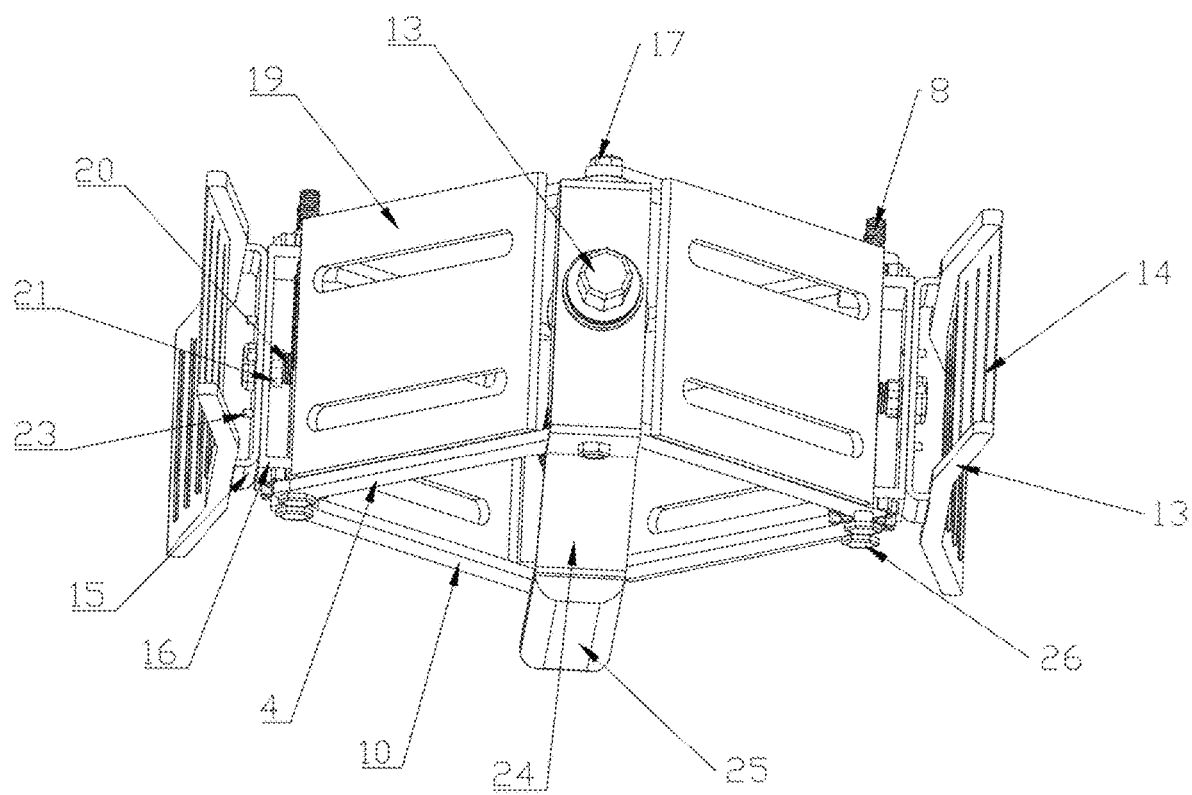
FIG. 3 illustrates a schematic structural diagram of the tire chock lock of FIG. 2 from another perspective.

As shown in FIG. 3, the handle 24 is provided to facilitate holding the tire chock lock of the disclosure, and the soft pad 25 provided on the side wall of the handle 24 improves the comfort of the user while holding the tire chock lock of the disclosure.

In an illustrated embodiment, the support plate 13 is provided with a plurality of antiskid textures 14 and a plurality of antiskid strips 27 disposed on the plurality of antiskid textures 14 respectively and the plurality of antiskid strips 27 are symmetrically arranged.

As shown in FIG. 6, each of the support plates 13 is provided with the plurality of antiskid strips 27, and when the support plates 13 support the tires, the friction force between the tires and the support plates 13 is increased to improve stability during supporting. In addition, the plurality of antiskid strips 27 on the support plate is symmetrically distributed to further improve the support stability.

In the disclosure, unless otherwise explicitly specified and defined, the terms "installation", "link", "connection", "fixation", and other terms should be understood in a broad sense. For example, the above terms can be understood as a fixed connection, a removable connection, or an integrated form; also can be understood as a mechanical connection or an electrical connection; further also can be understood as a direct connection, an indirect connection through intermediate media or an internal connection between two components or an interaction relationship between two components. In addition, there are many ways for disassembly and installation, such as a manner of matching the plug and buckle, or bolt connection.

The concept, specific structure, and technical effects of the disclosure are clearly and completely described above in combination with the embodiments and the attached drawings to fully understand the purpose, characteristics, and effects of the disclosure. Apparently, the described embodiments are only a part of the embodiments of the disclosure, not all of embodiments of the disclosure. Based on the embodiments of the disclosure, other embodiments obtained by those skilled in the related art without paying creative labor fall within the scope of protection of the disclosure. In addition, all of the contact/connection relationships described in the text does not simply refer to the direct connection of components, but rather to form a better connection structure by adding or reducing connection accessories according to specific implementation situations.

The illustrated description of the disclosure in the above embodiments is only used to further explain the disclosure and cannot be understood as limiting the scope of protection of the disclosure. Those skilled in the field make some non-essential improvements and adjustments to the disclosure based on the content of the disclosure, which fall within the scope of protection of the disclosure.

What is claimed is:

1. A rotatable tire chock lock, comprising:
 a threaded rod, wherein the threaded rod comprises a rotating portion and a threaded portion;
 a first nut slider, rotationally connected to the threaded rod;
 a second nut slider, screwed on the threaded portion of the threaded rod;
 a quadrangular support structure, disposed between the first nut slider and the second nut slider;
 two support plates, disposed on two ends of the quadrangular support structure respectively, and configured to support tires; and
 steering assemblies, each of the steering assemblies being disposed between a corresponding one of the two support plates and the quadrangular support structure, and configured to rotate the quadrangular support structure; wherein each steering assembly comprises:
 a connection frame;
 a limit bead fixing frame, disposed on a side wall of the support plate, wherein the limit bead fixing frame is mounted on the connection frame through a bolt structure; and
 an elastic pad, disposed on a side wall of the connection frame and configured to facilitate rotating the limit bead fixing frame and the connection frame after mounting.

2. The rotatable tire chock lock according to claim 1, wherein each steering assembly further comprises:
 a plurality of mounting holes, disposed on the limit bead fixing frame;
 a plurality of limit bead housings, disposed in the plurality of mounting holes respectively; wherein an inlet end of each of the plurality of limit bead housings is provided with a movable limit bead and a spring connected between the limit bead and an inner wall of the limit bead housing for resetting the limit bead; and
 a plurality of limit holes, disposed on the connection frame; wherein the plurality of limit holes correspond to the plurality of mounting holes respectively to facilitate the limit beads entering the connection frame.

3. The rotatable tire chock lock according to claim 1, wherein two ends of the connection frame are respectively provided with two groups of through holes;
 wherein the quadrangular support structure comprises: two groups of first support rods and two groups of second support rods; each steering assembly is disposed on ends of second support rods in each of the two groups of second support rods and on ends of first support rods in a corresponding group of the two groups of first support rods through a mounting structure; the mounting structure comprises: two connection rods, lock nuts and limit discs; the two groups of through holes are internally provided with the two connection rods, an end of each of the two connection rods is provided with an external thread, and the end of each connection rod is screwed on a corresponding through hole of the two groups of through holes; each of the first support rods and the second support rods is provided with a hole, and the two connection rods respectively penetrate the holes of the first support rods and the second support rods to connect with the lock nuts for locking the first support rods and the second support rods with the connection frame; and another ends of the two connection rods respectively penetrate the through holes to connect with the limit discs.

* * * * *